United States Patent [19]
Huston

[11] Patent Number: 5,588,987
[45] Date of Patent: Dec. 31, 1996

[54] DISCHARGE STREAM CONDITIONER AND METHOD

[76] Inventor: Paul O. Huston, 220 Snake Hill Rd., Trussville, Ala. 35173

[21] Appl. No.: 321,840

[22] Filed: Oct. 14, 1994

[51] Int. Cl.⁶ .................................................. B01D 19/00
[52] U.S. Cl. .......................... 95/260; 96/204; 138/42; 169/16; 366/338
[58] Field of Search .................... 95/242, 248, 260–262; 96/176, 178, 179, 197, 198, 204, 206, 207, 215, 216, 219, 220; 366/336–338; 138/42, 38; 169/14, 15, 16; 261/94, 98, DIG. 26, DIG. 72

[56] References Cited

U.S. PATENT DOCUMENTS

| | | | |
|---|---|---|---|
| 1,982,884 | 12/1934 | Schroder et al. | 261/DIG. 26 |
| 2,645,292 | 7/1953 | Williams | 169/15 |
| 2,908,334 | 10/1959 | Duggan et al. | 169/15 X |
| 3,235,003 | 2/1966 | Smith | 138/38 X |
| 3,286,992 | 11/1966 | Armeniades et al. | 138/42 X |
| 4,123,178 | 10/1978 | Salzman et al. | 366/338 |
| 4,258,782 | 3/1981 | Kao | 366/338 X |
| 4,303,419 | 12/1981 | Frank et al. | 55/518 X |
| 4,405,345 | 9/1983 | Van Oorschot | 55/325 X |
| 4,818,346 | 4/1989 | Bentham et al. | 202/197 |
| 4,971,117 | 11/1990 | Hendrickson | 138/41 |
| 4,993,599 | 2/1991 | Gruenewald | 366/336 X |

FOREIGN PATENT DOCUMENTS

| | | | |
|---|---|---|---|
| 484081 | 8/1953 | Italy | 96/206 |
| 1304845 | 4/1987 | U.S.S.R. | 96/215 |
| 1344385 | 10/1987 | U.S.S.R. | 96/216 |

*Primary Examiner*—Richard L. Chiesa
*Attorney, Agent, or Firm*—Wm. Randall May

[57] ABSTRACT

A discharge stream conditioner and method for improving the efficiency and effectiveness of devices which discharge pressurized liquids is disclosed. An elongated rod having a plurality of outwardly radiating, spiraling, fingers or spokes is placed within the discharge conduit or flow path of a pressurized liquid to be discharged. The purpose of the discharge stream conditioner and method is to effectuate a partial separation of the propellant gas which has dissolved into the liquid agent to be discharged thereby providing for a more even flow and more efficient discharge of the liquid agent from its pressurized container.

12 Claims, 3 Drawing Sheets

DISCHARGE STREAM CONDITIONER AND METHOD

BACKGROUND OF THE INVENTION

I. Field of the Invention

This invention relates generally to discharge devices for pressurized fluids such as devices used for facilitating the discharge of liquid aerosols and certain fire extinguishers. More specifically, this invention relates to a method and apparatus for significantly improving the discharge efficiency and effectiveness of such devices by conditioning the discharge stream of the device during discharge.

II. Prior Art and Other Considerations

An important aspect of containers for dispersing liquids under pressure is the ability of the device to effectively discharge and place its active ingredients at desired locations and over a desired area of treatment in an appropriate concentration or density necessary to accomplish the desired function or task. This ability is of critical importance with regard to fire extinguishing units and is of special importance in liquified-gas type fire extinguishers. Prior art fire extinguishers of the liquified-gas variety typically contain either liquid carbon dioxide or liquid Halon as the extinguishing agent. These fire extinguishing agents are maintained in liquid form, under pressure, until discharged from the container. Typically, compressed nitrogen or another similarly inert gas is used to pressurize the vessel. However, these pressurizing mediums have a tendency to dissolve with the dispersement liquid sometimes causing the liquid to be discharged in a more gaseous than liquid state. Halogenated agents, such as Bromochlorodifluromethane (HALON 1211), Bromotrifluoromethane (HALON 1301) and mixtures of HALON 1211 & 1301, have been used for many years and are highly effective as fire extinguishants for virtually all classes of fires. However, these agents have been included in the Montreal Protocol list of controlled substances and are scheduled for discontinuance in the near future. Replacement agents are being investigated and tested, however, discharge problems which have plagued the aerosol and pressurized liquid industry for years continue to be a problem with the proposed replacement agents. One of the typical problems associated with this industry has been oscillating, uneven, sometimes liquid—sometimes gaseous, discharge streams. This phenomenon is commonly referred to within the industry as "chugging" and can seriously effect the efficiency and effectiveness of liquified-gas fire extinguishers and other aerosols. Chugging occurs when too much of the propellant medium, such as nitrogen, becomes dissolved within the liquid agent to be dispersed thereby creating an uneven flow of the liquid agent and a more gaseous discharge. A smooth, less gaseous, flow has been found to significantly improve the fire fighting effectiveness of liquified-gas type fire extinguishers.

A continuing need exists, therefore, for the provision of method and apparatus which will effectively reduce the amount of dissolved propellant within the discharge stream of a pressurized fluid discharge vessel during discharge thereby providing for a smooth, less gaseous flow of liquid agent from the vessel. The present invention provides method and apparatus which can be used with virtually any pressurized liquid dispersement device to condition the discharge stream of the device thereby significantly improving its efficiency and effectiveness and eliminating the unwanted "chugging" characteristics associated with the prior art.

SUMMARY OF THE INVENTION

The present invention is designed to be inserted or placed into the flow path of a pressurized fluid or liquid as the pressurized fluid or liquid is being discharged from its containment vessel.

In view of the foregoing, it is a primary object of this invention to provide method and apparatus for significantly improving the overall efficiency and effectiveness of pressurized fluid discharge devices such as liquified-gas fire extinguishers and other liquid aerosols having a valve/nozzle system of discharge.

An important advantage of the present invention is the provision of method and apparatus which produces a smooth, less gaseous, flow of liquid medium from a pressurized fluid discharge container.

Another important advantage of the present invention is the provision of method and apparatus which, when used with liquified-gas type fire extinguishers, effectuates a partial separation of some of the propellant gas thereby conditioning the eventual discharge spray to be more concentrated with liquid extinguishant.

An advantage of the present invention is the provision of a discharge conditioning apparatus which can be placed at virtually any location along the discharge flow path or flow conduit of a pressurized liquid containment vessel.

An advantage of the present invention is the provision of a discharge conditioning apparatus which can conform to virtually any size or shape of pressurized liquid containment vessel and can accommodate virtually any flow rate.

A further advantage of the present invention is that the invention promotes the displacement of propellant, during discharge, which has dissolved into the liquid medium of pressurized liquid containment vessels thereby effectively eliminating the "chugging" phenomenon commonly associated with such devices.

A further advantage of the present invention is the provision of method and apparatus which significantly improves the horizontal range and time of discharge of liquified-gas type fire extinguishers.

According to an embodiment of the invention, a discharge stream conditioner for use with pressurized liquid containment vessels comprises an elongated rod having an arrangement of radiating, "spiraling" spokes or fingers extending and projecting therefrom. The rod can be attached virtually anywhere along the discharge flow path of the pressurized vessel, with the number, length and cross-sectional dimensions of the device being dependant upon the discharge characteristics of the particular host vessel.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a perspective view of an embodiment of the invention.

FIG. 2 is a perspective view of a smaller version of the embodiment of FIG. 1.

FIG. 3 is a frontal view of the embodiment of FIG. 1 with placement indicators to indicate the position of the device within a typical liquified-gas type fire extinguisher.

FIG. 4 is a cross-sectional view of a typical liquified-gas type fire extinguisher showing the placement of an embodiment of the invention within the syphon tube of the extinguisher.

DETAILED DESCRIPTION OF THE PREFERRED EMBODIMENTS

Figure 1:
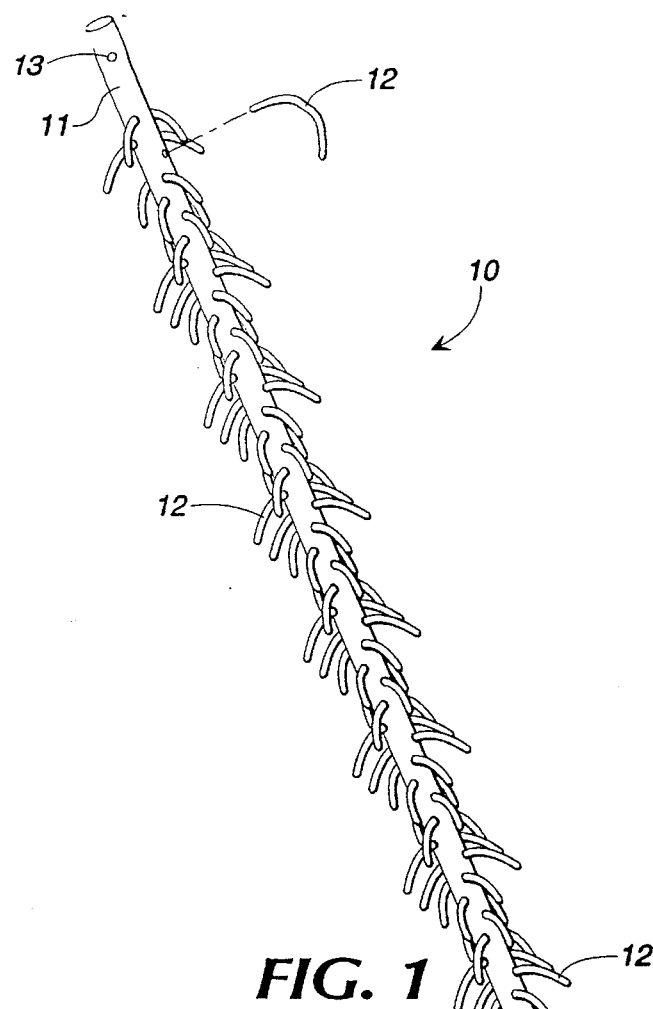
Figure 2:
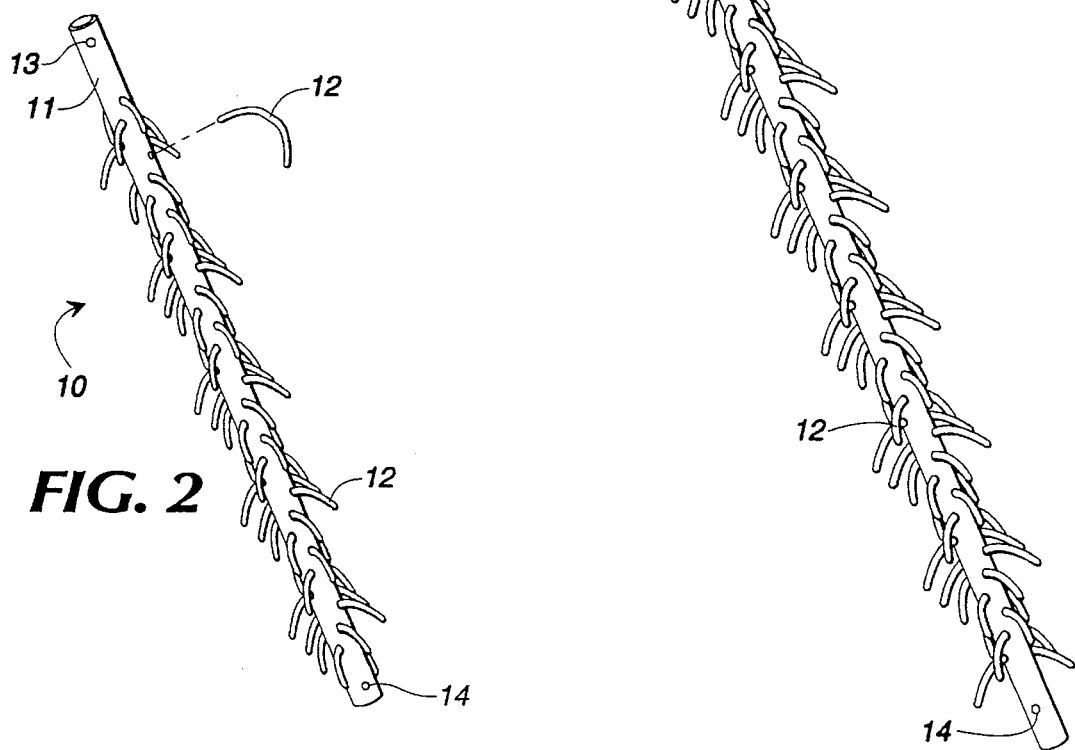

FIG. 1 shows a discharge stream conditioner 10 according to a first embodiment of the invention. The discharge stream conditioner 10 comprises an elongated rod 11 having a plurality of outwardly radiating fingers 12. Said fingers 12 are spaceably and orderly attached to said rod 11 over and along substantially the entire length and surface area of the rod 11. Attachment holes 13 & 14 are provided at either end of said rod 11 for securing the device 10 within the discharge conduit or flow path of a pressurized fluid discharge vessel. FIG. 2 shows a scaled down version of the invention 10 for use with smaller pressurized liquid discharge vessels or for use within flexible discharge conduits such as the hose section of certain fire extinguishers.

As shown in FIGS. 1 & 2, each radiating finger 12 is cambered toward one end of the rod 11. The fingers 12 are rigidly and spaceably attached to said rod 11 and are arranged in a repetitive, continuous, spiral beginning at one end of said rod 11 and continuing, uninterrupted, toward the opposite end of the rod 11. The configuration of said fingers 12, when the device 10 is deployed within the discharge flow path of a pressurized liquid discharge vessel (such as the liquified-gas fire extinguisher 30 shown in FIGS. 3 & 4), causes a partial separation of the dissolved propellant gas used to propel the liquid agent contained within such vessel, thereby creating a more consistent, less gaseous, discharge flow from such vessels.

Figure 3:
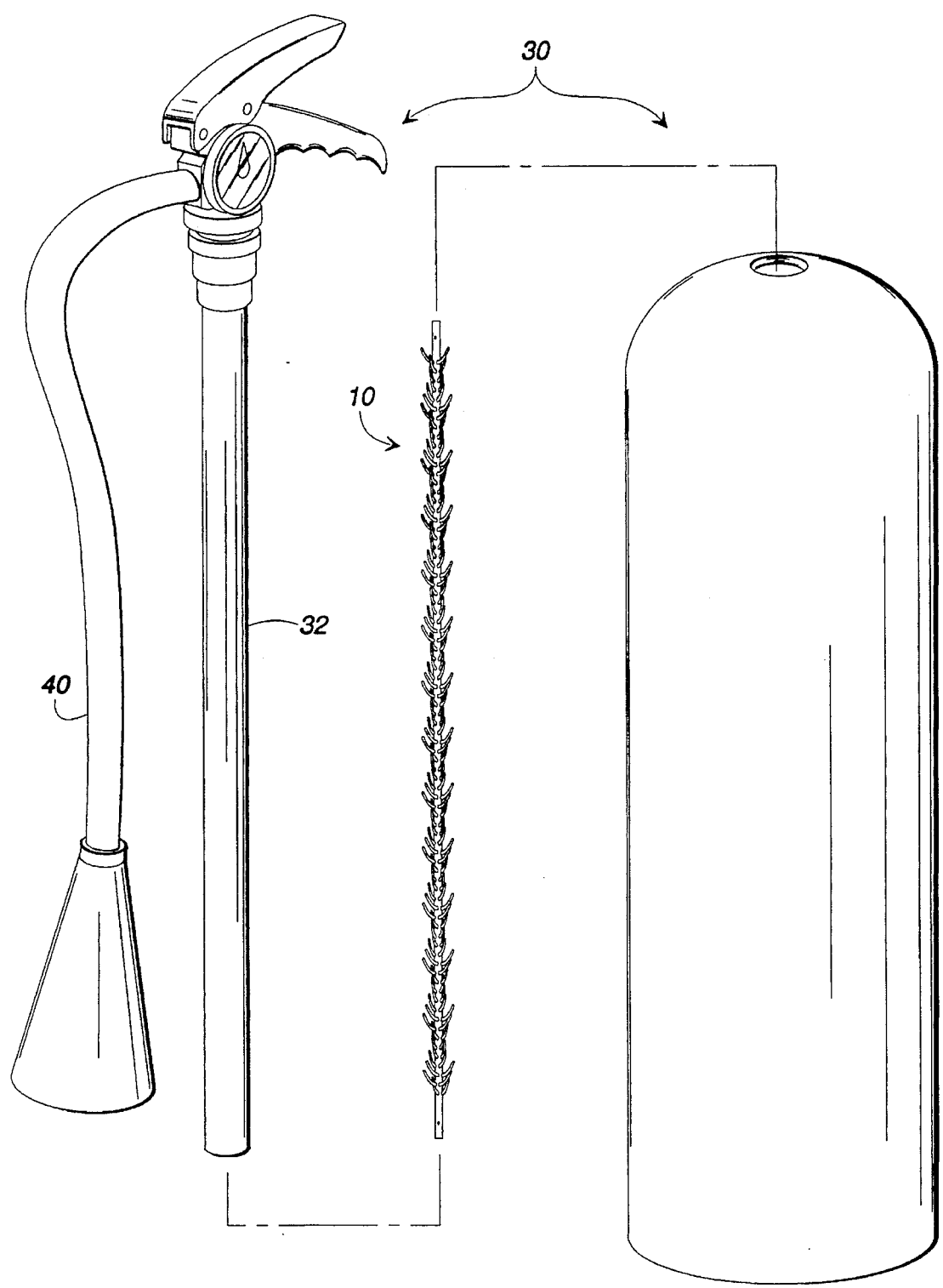
Figures 4, 5, 6:
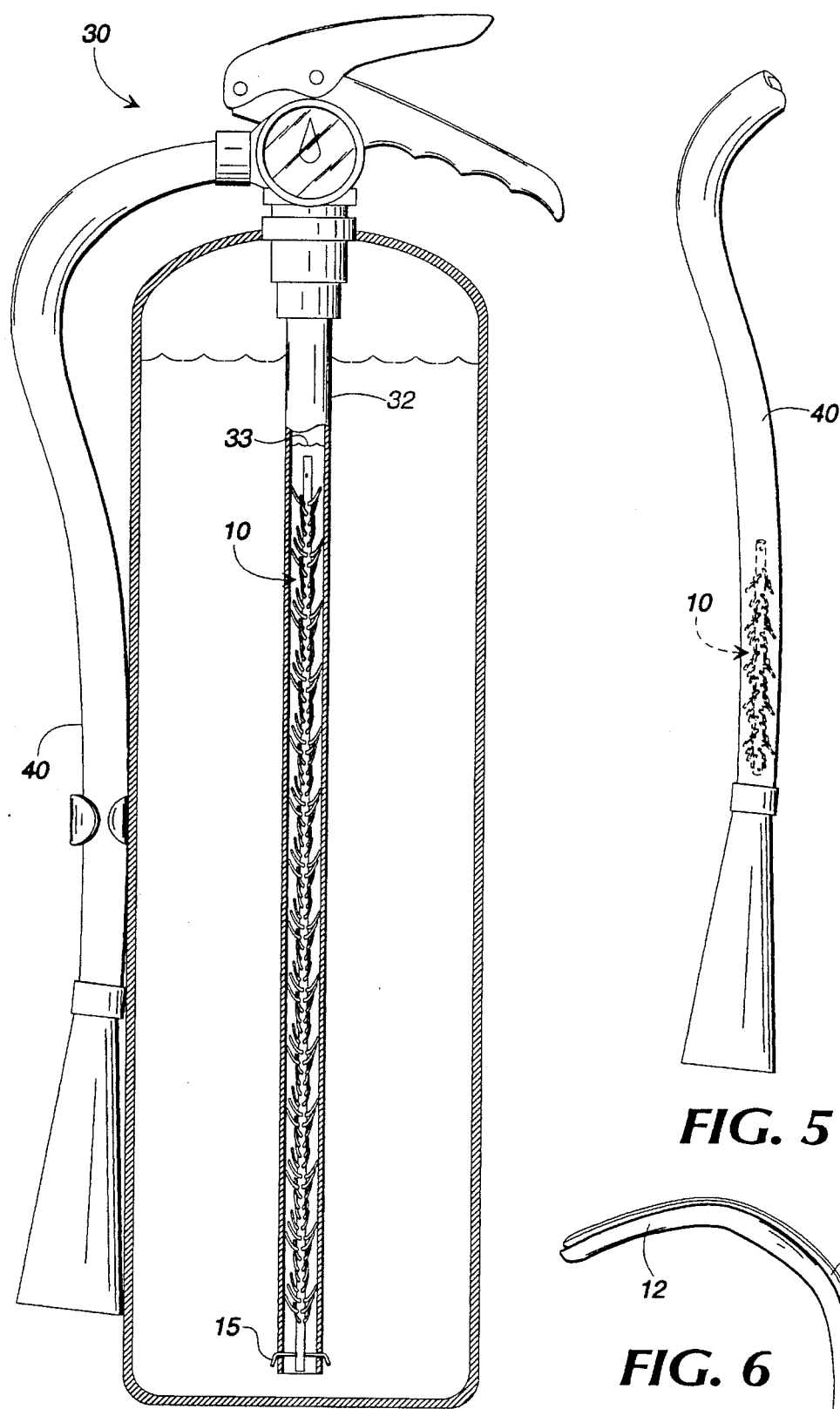
FIG. 5 is a frontal view of the embodiment of FIG. 2 shown within the hose portion of the discharge conduit of a typical liquified-gas type fire extinguisher.
FIG. 6 is an alternate embodiment of the radiating fingers of the embodiment of FIG. 1.

FIG. 3 shows the device 10 as it would be typically installed within a portable liquified-gas type fire extinguisher 30. While the invention 10 can be placed virtually anywhere along the discharge flow path of a pressurized liquid agent, testing has determined that the preferred location of the device 10, when used with a portable liquified-gas type fire extinguisher, is within the syphon tube 32 of the extinguisher 30. As best seen in FIG. 4, when the device 10 is placed within the syphon tube 32 of a fire extinguisher 30, the device 10 is positioned so that the radiating, spiraling, fingers 12 are cambered away from the direction of the discharge flow. The overall length of the device 10 and the length and camber of the radiating fingers 12 are determined by the discharge pressure and other characteristics (such as the type of liquid agent and the type of propellant being used) of the host pressurized liquid discharge vessel. The radiating fingers 12 are arranged so that the cross-sectional diameter of the device 10 is such that at least a portion of the radiating fingers 12 are caused to frictionally engage the interior wall 33 of the syphon tube 32, or other discharge conduit of the host vessel. The frictional engagement of said fingers 12 with the interior wall 33 of the syphon tube 32 serves to retard the rotational or linear movement of said fingers 12 during discharge. For additional stability, a securing pin 15 is provided for insertion through one or both attachment holes 13 & 14 of rod 11. The securing pin 15 provides rotational and linear stability for the device 10 during discharge and allows the device 10 to be detachably secured, for cleaning, inspection or repair, to the syphon tube 32 or other discharge conduit of host vessel, such as the fire extinguisher 30 shown in FIGS. 3 & 4.

FIG. 5 shows a smaller version of the invention 10 (as seen in FIG. 2) installed within the discharge hose 40 section of a typical pressurized liquid discharge vessel such as a liquified-gas type fire extinguisher. In order to accommodate the flexibility of said discharge hose 40 and to provide optimal discharge stream conditioning, more than one of the devices 10 may be required to be installed within said hose 40.

FIG. 6 shows an alternate embodiment of the radiating fingers 12 of the device 10 wherein said fingers 12 contain linear grooves 20 along the surface of said fingers 12. Tests have confirmed that said grooves 20 serve to further facilitate the partial separation of dissolved gas within certain liquid discharge agents during the discharge of said agents from a pressurized liquid discharge vessel.

While the general configuration of the present embodiment of the invention 10 is as described herein, it will be understood that, for optimal results, the precise length of the rod 11, the number of rods 11 required, and the camber and arrangement of the radiating fingers 12 are necessarily determined by the physical characteristics of the host vessel and the type of propellant and discharge agent utilized therewith. Furthermore, while the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. A discharge stream conditioner positioned in a pressurized liquid containment vessel comprising a tank filled with pressurized liquid, a syphon tube extending into said liquid, a valve means and a discharge means, said discharge stream conditioner being frictionally positioned within said syphon tube and comprising an elongated rod having a plurality of radiating, cambered, fingers attached thereto and extending outwardly therefrom and arranged in a repetitive, continuous spiral beginning at one end of said rod and continuing uninterrupted toward the opposite end of said rod so that at least a portion of said fingers are caused to frictionally engage the interior wall of said syphon tube.

2. The discharge stream conditioner of claim 1, wherein said fingers vary in length and diameter.

3. The discharge stream conditioner of claim 1, wherein said fingers vary in length and diameter according to the size, shape and discharge characteristics of the host pressurized liquid containment vessel.

4. The discharge stream conditioner of claim 1, wherein said fingers vary in camber.

5. The discharge stream conditioner of claim 1, wherein said fingers vary in camber according to the size, shape and discharge characteristics of the host pressurized liquid containment vessel.

6. The discharge stream conditioner of claim 1, wherein said cambered fingers are cambered away from the direction of the flow of the liquid.

7. The discharge stream conditioner of claim 1, wherein said rod varies in length and diameter according to the size, shape and discharge characteristics of the host pressurized liquid containment vessel.

8. The discharge stream conditioner of claim 1, wherein said fingers extend over and along substantially the entire length and surface area of said rod.

9. The discharge stream conditioner of claim 1, wherein said fingers further comprise linear grooves along the surface of said fingers.

10. The discharge stream conditioner of claim 1, wherein said pressurized liquid containment vessel is a liquified-gas fire extinguisher.

11. A method of effectuating a partial separation of gas molecules dissolved in a liquid under pressure during discharge of said liquid from a pressurized liquid containment vessel having a tank filled with said liquid, a syphon tube, a valve means and a discharge means, said method comprising the steps of:

frictionally inserting an elongated rod having a plurality of radiating, cambered, fingers attached thereto and extending outwardly therefrom into said syphon tube and the discharge flow path of said liquid and arranged in a repetitive, continuous spiral beginning at one end of said rod and continuing uninterrupted toward the opposite end of said rod so that at least a portion of said fingers are caused to frictionally engage the interior wall of said syphon tube; and, causing said liquid to flow or be discharged from said liquid containment vessel through said syphon tube and over and along the longitudinal axis of said rod and through said radiating fingers.

12. The method of claim 11, wherein said cambered fingers are cambered away from the direction of the flow of the liquid.

* * * * *